United States Patent [19]

Tajima et al.

[11] Patent Number: 5,013,802
[45] Date of Patent: May 7, 1991

[54] PROCESS FOR PREPARING ETHYLENE POLYMERS

[75] Inventors: Yoshio Tajima, Tokyo; Kazutosi Nomiyama, Akishima; Yoshinori Nishikitani; Nobuyuki Kuroda, both of Yokohama; Kazuo Matsuura, Tokyo, all of Japan

[73] Assignee: Nippon Oil Company, Limited, Tokyo, Japan

[21] Appl. No.: 427,941

[22] Filed: Oct. 25, 1989

Related U.S. Application Data

[63] Continuation of Ser. No. 22,378, Mar. 5, 1987, abandoned.

[30] Foreign Application Priority Data

Mar. 7, 1986 [JP] Japan ................................ 61-48525

[51] Int. Cl.$^5$ ........................... C08F 2/14; C08F 10/02
[52] U.S. Cl. ......................................... 526/86; 526/65; 526/97; 526/348.6; 526/352
[58] Field of Search ............................ 526/65, 86, 97

[56] References Cited

U.S. PATENT DOCUMENTS

| | | | |
|---|---|---|---|
| 2,889,314 | 6/1959 | Fritz | 526/65 |
| 3,074,922 | 1/1963 | Dye et al. | 526/65 |
| 3,242,099 | 3/1966 | Manyik et al. | 526/153 |
| 3,392,213 | 7/1968 | Berger | 526/65 |
| 3,489,823 | 1/1970 | Naarmann et al. | 526/86 |
| 3,592,880 | 7/1971 | Diedrich et al. | |
| 3,595,850 | 7/1971 | Takayanagi et al. | 526/86 |
| 3,639,378 | 2/1972 | Long | 526/105 |
| 3,692,712 | 9/1972 | Crouch | 526/86 |
| 3,801,558 | 4/1974 | Fletcher et al. | 526/142 |
| 3,935,180 | 1/1976 | Sugiura et al. | 526/86 |
| 4,098,974 | 7/1978 | Klaasen | |
| 4,113,440 | 9/1978 | Klaasen | |
| 4,210,734 | 7/1980 | Machon | 526/65 |
| 4,285,834 | 8/1981 | Lowery et al. | 526/129 |
| 4,329,253 | 5/1982 | Goodell et al. | 526/125 |
| 4,368,291 | 1/1983 | Frese et al. | 525/53 |
| 4,414,369 | 11/1983 | Kuroda et al. | 526/65 |

FOREIGN PATENT DOCUMENTS

| | | |
|---|---|---|
| 3215 | 3/1970 | Japan . |
| 106581 | 9/1974 | Japan . |
| 23864 | 3/1975 | Japan . |
| 152 | 1/1976 | Japan . |
| 3514 | 1/1976 | Japan . |
| 42584 | 4/1977 | Japan . |
| 100445 | 3/1979 | Japan . |
| 134789 | 10/1979 | Japan . |
| 133136 | 8/1982 | Japan . |
| 1405255 | 9/1975 | United Kingdom ............ 526/97 |

Primary Examiner—Edward J. Smith
Attorney, Agent, or Firm—Dilworth & Barrese

[57] ABSTRACT

A process for preparing an ethylene polymer by a two-stage polymerization of ethylene or ethylene and an α-olefin in an inert hydrocarbon at 50°–100° C. using a coordination polymerization catalyst containing a solid component and an organoaluminum compound, said solid component containing a transition metal compound, which process comprises:

(a) in a first stage, producing 10–90% by weight based on the total polymer quantity of a polymer having a melt index in the range of 0.0001 to 0.5 g/10 min as measured according to ASTM D 1238-73, Condition E, using as said solid component a solid product obtained by supporting chromium trioxide or a compound which on calcining forms chromium oxide at least partially, on an inorganic oxide carrier followed by calcining, and using as said organoaluminum compound a compound of the general formula

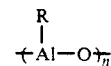

wherein R is a hydrocarbon radical having 1 to 18 carbon atoms and n is $2 \leq n \leq 100$; and (b) in a second stage, producing 90–10% by weight based on the total polymer quantity of a polymer having a melt index in the range of 0.01 to 50 g/10 min as measured according to ASTM D 1238-73, Condition E, using as said solid component a solid material containing at least magnesium and titanium, and using as said organoaluminum compound a compound of the general formula AlR'$_p$X$_{3-p}$ wherein R' is a hydrocarbon radical having 1 to 20 carbon atoms, X is halogen and/or alkoxy and p is $0 < p \leq 3$, in the presence of the polymer obtained in the first stage.

5 Claims, No Drawings

PROCESS FOR PREPARING ETHYLENE POLYMERS

This is a continuation of co-pending application Ser. No. 022,378 filed on Mar. 5, 1987, now abandoned.

BACKGROUND OF THE INVENTION

The present invention relates to a process for preparing polyethylenes having a wide molecular weight distribution and superior in melting characteristic and moldability. More particularly, it is concerned with a process for preparing polyethylenes superior in performance by combining a specific catalyst with a two-stage polymerization process.

In general, polyolefins used for obtaining molded or formed articles such as bottles, cable conduits and ultra-thin films are required to fully withstand molding or forming conditions in plastisized state and be formed into desired shapes easily. This requirement may be satisfied by the use of a polyolefin having an increased melt index (a lowered average molecular weight). Such a polyolefin, however, can only afford a product inferior in strength, e.g. impact resistance and tensile strength. On the other hand, a polyolefin having a low melt index afford a product superior in strength, which product, however, is inferior in moldability. It is known that this problem can be solved by using a polyolefin having a wide molecular weight distribution.

Moreover, physical properties required for polyethylenes have been diversified recently, and also from the standpoint of resources saving there is a tendency to using resin in an amount as small as possible in a range not impairing physical properties. For example, as to bottles and films, there is now a tendency to make them as thin as possible while maintaining their strength. A polyethylene which even in a small amount exhibits good processability and high impact strength, tensile strength and resistance to environmental stress cracking is keenly desired.

Several methods have been proposed as methods for preparing polyethylenes having a wide molecular weight distribution. According to one proposed method, a high molecular weight polyethylene and a low molecular weight polyethylene are mixed together (see Japanese Patent Publication No.3215/1970 and Japanese Patent Laid Open Nos.100445/1979 and 133136/1982). A two or more multi-stage polymerization method has also been proposed (see Japanese Patent Publication No.11349/1971 and Japanese Patent Laid Open No.19788/1977).

Polymers prepared by such proposed methods are wide in molecular weight distribution and fairly good in resistance to environmental stress cracking (hereinafter referred to as "ESCR"), but are poor in melt viscoelasticity during molding, and molded products obtained using such polymers are apt to have fish eye or gel.

SUMMARY OF THE INVENTION

It is the object of the present invention to remedy the above-mentioned drawbacks and provide a process for preparing polyethylenes not only wide in molecular weight distribution but also superior in melt characteristic and moldability.

In one aspect the present invention resides in a process for preparing an ethylene polymer by a two-stage polymerization of ethylene or ethylene and an α-olefin in an inert hydrocarbon at 50–100° C. using a coordination polymerization catalyst containing a solid component and an organoaluminum compound, the solid component containing a transition metal compound, which process comprises:

(a) in a first stage, producing 10–90% by weight based on the total polymer quantity of a polymer having a melt index (ASTM D 1238-73, Condition E) in the range of 0.0001 to 0.5 g/10 min, using as the solid component a solid product obtained by supporting chromium trioxide or a compound which on calcining forms chromium oxide at least partially, on an inorganic oxide carrier followed by calcining, and using as the organoaluminum compound a compound of the general formula

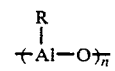

wherein R is a hydrocarbon radical having 1 to 18 carbon atoms and n is $2 \leq n \leq 100$; and (b) in a second stage, producing 90–10% by weight based on the total polymer quantity of a polymer having a melt index (ASTM D 1238-73, Condition E) in the range of 0.01 to 50 g/10 min, using as the solid component a solid material containing at least magnesium and titanium, and using as the organoaluminum compound a compound of the general formula $AlR'_pX_{3-p}$ wherein R' is a hydrocarbon radical having 1 to 20 carbon atoms, X is halogen and/or alkoxy and p is $0 \leq p \leq 3$, in the presence of the polymer obtained in the first stage.

In another aspect the present invention resides in a process for preparing an ethylene polymer by a two-stage polymerization of ethylene or ethylene and an α-olefin in an inert hydrocarbon at 50–100° C. using a coordination polymerization catalyst containing a solid component and an organoaluminum compound, the solid component containing a transition metal compound, which process comprises:

(a) in a first stage, producing 10–90% by weight based on the total polymer quantity of a polymer having a melt index (ASTM D 1238-73, Condition E) in the range of 0.0001 to 0.5 g/10 min, using as the solid component a solid product and a solid material containing at least magnesium and titanium, the solid product being obtained by supporting chromium trioxide or a compound which on calcining forms chromium oxide at least partially, on an inorganic oxide carrier followed by calcining, and using as the organoaluminum compound a compound of the general formula

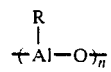

wherein R is a hydrocarbon radical having 1 to 18 carbon atoms and n is $2 \leq n \leq 100$; and (b) in a second stage, producing 90–10% by weight based on the total polymer quantity of a polymer having a melt index (ASTM D 1238-73, Condition E) in the range of 0.01 to 50 g/10 min, by adding a compound of the general formula $AlR'_pX_{3-p}$ wherein R' is a hydrocarbon radical having 1 to 20 carbon atoms, X is halogen and/or alkoxy and p is $0 < p \leq 3$, after completion of the first-stage polymerization.

According to the present invention there are obtained polyethylenes having a wide molecular weight distribution, a high ESCR and a good melting characteristic and free from fish eye.

DETAILED DESCRIPTION OF THE INVENTION

Chromium Oxide Supported Solid Catalyst Component

As examples of the inorganic oxide carrier for supporting chromium trioxide or a compound which on calcining forms chromium oxide at least partially, there are mentioned silica, alumina, silica-alumina, titania, zirconia, thoria, and mixtures thereof, with silica and silica-alumina being preferred.

As examples of the chromium compound to be supported there are mentioned oxides of chromium and compounds which on calcining form chromium oxides at least partially, such as halides, oxyhalides, nitrate, acetate, sulfate and alcoholates of chromium. More concrete examples are chromium trioxide, chromyl chloride, potassium dichromate, ammonium chromate, chromium nitrate, chromium acetate, chromium acetylacetonate and di-tert-butyl chromate.

The chromium compound may be supported on the carrier by a known method such as impregnation, solvent distilling-off or sublimation. A suitable method may be selected according to the kind of the chromium compound used. The amount of chromium to be supported is in the range of 0.1 to 10, preferably 0.3 to 5, more preferably 0.5 to 3, in terms of weight percent of chromium atom based on the weight of the carrier.

The carrier with the chromium compound thus supported thereon is then calcined to effect activation. This calcining operation for activation is generally carried out in a substantially water-free non-reducing atmosphere, for example, in the presence of oxygen. But it may be done in the presence of an inert gas or under reduced pressure. Preferably, dry air is used. Other conditions for the calcination involve a temperature not lower than 450° C., preferably in the range of 500° to 900° C., and a period of time in the range of several minutes to several hours, preferably 0.5 to 10 hours. It is desirable that the calcination be performed using a thoroughly dry air to effect activation in a fluidized state.

The chromium compound supporting method or the calcining method may be combined with a known method for adjusting activity which method employs titanates or fluorine-containing salts.

Solid Catalyst Component Containing at least Magnesium and Titanium

As examples of the solid catalyst component containing magnesium and titanium, used in the present invention, there are mentioned those obtained by supporting titanium compounds in a known manner on inorganic solid carriers such as, for example, metal magnesium, magnesium hydroxide, magnesium carbonate, magnesium oxide, magnesium chloride, as well as double salt, double oxide, carbonate, chloride and hydroxide each containing a magnesium atom and a metal selected from silicon, aluminum and calcium, further those obtained by treating or reacting these inorganic solid carriers with oxygen-containing compounds, sulfur-containing compounds, hydrocarbons, halogen-containing materials, silicon-containing compounds, nitrogen-containing compounds, or phosphorus-containing compounds.

In connection with the above description, examples of oxygen-containing compounds are alcohols, aldehydes, ketones, ethers, carboxylic acids, and derivatives thereof. Preferred examples of sulfur-containing compounds are thiophene and thiols. As hydrocarbons, aromatic hydrocarbons are preferred such as, for example, durene, anthracene and naphthalene. As halogen-containing materials, halogenated hydrocarbons are preferred such as, for example, 1,2-dichloroethane, n-butyl chloride, t-butyl chloride and p-dichlorobenzene. Preferred examples of silicon-containing compounds are tetraethoxysilane, vinyltriethoxysilane and allyltriethoxysilane. Examples of nitrogen-containing compounds are acid amides, amines and nitriles, with benzoic acid amide, pyridine and benzonitrile being particularly preferred. As examples of phosphorus-containing compounds are mentioned phosphates and phosphites; particularly preferred are triphenyl phosphite, triphenyl phosphate, tri-n-butyl phosphite and tri-n-butyl phosphate.

As other examples of the solid catalyst component containing at least magnesium and titanium, which are suitable for use in the present invention, mention may be made of reaction products of organomagnesium compounds such as so-called Grignard compounds and titanium compounds. As examples of organomagnesium compounds are mentioned those represented by the general formulae $RMgX$, $R_2Mg$ and $RMg(OR)$ wherein R is an organic radical and X is halogen, as well as ether complexes thereof and those obtained by modifying these organomagnesium compounds with other organometallic compounds such as organosodium, organolithium, organopotassium, organoboron and organozinc.

Titanium compounds which may be used in the present invention include halides, alkoxyhalides, oxides and halogenated oxides, of titanium Examples are tetravalent titanium compounds such as titanium tetrachloride, titanium tetraiodide, monoethoxytrichlorotitanium, diethoxydichlorotitanium, triethoxymonochlorotitanium, tetraethoxytitanium, monoisopropoxytrichlorotitanium, diisopropoxydichlorotitanium, and tetraisopropoxytitanium; titanium trihalides obtained by reducing titanium tetrahalides with hydrogen, aluminum, titanium or an organometallic compound; as well as trivalent titanium compounds such as those obtained by reducing tetravalent alkoxytitanium halides with an organometallic compound. Tetravelent titanium compounds are particularly preferred.

Concrete examples are the following systems: $MgO$-$RX$-$TiCl_4$ (Japanese Patent Publication No. 3514/1976), $MgO$-$AlCl_3$-$TiCl_4$ (Japanese Patent Laid Open No.134789/1979), $Mg$-$SiCl_4$-$ROH$-$TiCl_4$ (Japanese Patent Publication No.23864/1975), $MgCl_2$-$Al(OR)_3TiCl_4$ (Japanese Patent Publication Nos.152/1976 and 15111/1977), $MgCl_2$-Aromatic hydrocarbon-$TiCl_4$ (Japanese Patent Publication No.48915/1977), $MgCl_2$-$SiCl_4$-$ROH$-$TiCl_4$ (Japanese Patent Laid Open No.106581/1974), $Mg(OOCR)_2$-$Al(OR)_3$-$TiCl_4$ (Japanese Patent Publication No.11710/1977), $MgCl_2$-$RX$-$TiCl_4$ (Japanese Patent Laid Open No.42584/1977), $Mg$-$POCl_3$-$TiCl_4$ (Japanese Patent Publication No.153/1976), $MgCl_2$-$AlOCl$-$TiCl_4$ (Japanese Patent Publication No. 15316/1979), $RMgX$-$TiCl_4$ (Japanese Patent Publication No.39470/1975), $MgCl_2$-$CH_2$=$CHSi(OR)_3$-$P(OR)_3$-$ROR$-$TiCl_4$ (Japanese Patent Application No.178272/1983), and $MgCl_2$-$CH_2$=$CHSi(OR)_3$-$P(OR)_3$-$TiCl_4$ (Japanese Patent Application No.3558/1983).

Organoaluminum Compound

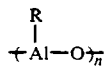  (1)

The compound of the general formula

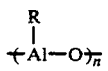

used in the present invention wherein R is a hydrocarbon radical, preferably alkyl group, having 1 to 18 carbon atoms and n is $2 \leq n \leq 100$, preferably $2 \leq n \leq 50$, is a compound (hereinafter referred to as the "modified organoaluminum compound") obtained by the reaction of trialkylaluminum and water. The reaction of trialkylaluminum and water is usually carried out in an inert hydrocarbon. Examples of inert hydrocarbons include aliphatic, alicyclic and aromatic hydrocarbons such as pentane, hexane, heptane, cyclohexane, methylcyclohexane, benzene, toluene and xylene, with aliphatic and alicyclic hydrocarbons being preferred.

As examples of the alkyl group in the trialkylaluminum there are mentioned ethyl, propyl, isopropyl, butyl, isobutyl, pentyl, hexyl, octyl, decyl and dodecyl, with isobutyl being particularly preferred.

The ratio of water to trialkylaluminum (water/Al mole ratio) is in the range of 0.25/1 to 1.2/1, preferably 0.5/1 to 1/1. The reaction temperature is in the range of $-70°$ C. to 100° C., preferably $-70°$ to 20° C., and the reaction time is in the range of 5 to 100 minutes, preferably 10 to 30 minutes. The modified organoaluminum compound thus obtained is used in a proportion of 1000/1 to 1/1, preferably 100/1 to 10/1, in terms of Al/Cr (mole ratio).

$$AlR'_p X_{3-p} \quad (2)$$

As examples of another aluminum compound of the general formula $AlR'_p X_{3-p}$ used in the invention wherein R' is a hydrocarbon radical, preferably an alkyl group, having 1 to 20 carbon atoms, X is halogen and/or alkoxy and p is $0 < p \leq 3$, mention may br made of organoaluminum compounds of the general formulae $R_3Al$, $R_2AlX$, $RAlX_2$, $R_2AlOR$, $RAl(OR)X$ and $R_3Al_2X_3$. More concrete examples are triethylaluminum, triisobutylaluminum, trihexylaluminum, trioctylaluminum, diethylaluminum chloride, ethylaluminum dichloride, diethylaluminum ethoxide, ethylaluminum sesquichloride, and mixtures thereof.

The amount of the aluminum compound $AlR'_p X_{3-p}$ is not specially limited, but usually it is in the range of 0.1 to 1000 moles per mole of the titanium compound.

Polymerization of Ethylene

The present invention involves homopolymerization of ethylene and/or copolymerization of ethylene and an α-olefin, e.g. propylene, butene-1, pentene-1, 4-methyl-1-pentene or hexene-1, performed in two stages.

The polymerization reaction is carried out at 50–100° C. in an inert hydrocarbon solvent such as an aliphatic hydrocarbon, e.g. hexane or heptane, an aromatic hydrocarbon, e.g. benzene, toluene or xylene, or an alicyclic hydrocarbon, e.g. cyclohexane or methylcyclohexane, in the presence of the catalyst described above.

The present invention is characteristic in that a polymer having excellent physical properties can be obtained continuously, more specifically, in a first stage a high molecular weight polymer is produced using a catalyst comprising the chromium oxide-supported solid catalyst component and the modified organoaluminum compound and then in a second stage a relatively low molecular weight polymer is produced using a catalyst comprising the solid catalyst component containing at least magnesium and titanium and the aluminum compound $AlR'_p X_{3-p}$. This two-stage polymerization will be described below in more detail.

The first-stage polymerization is performed using a catalyst comprising the chromium oxide-supported solid catalyst component and the modified organoaluminum compound. In this case, if the aluminum compound of the general formula $AlR'_p X_{3-p}$ is used in place of the modified organoaluminum compound, a high polymerization activity will not be developed; besides, the resulting polymer will be extremely large in the proportion of a low molecular weight polymer. Thus the replacement with the aluminum compound is not desirable. The same can also be said of the case where the chromium oxide-supported solid catalyst component and the solid catalyst component containing at least magnesium and titanium are used in combination.

The first-stage polymerization is carried out in an inert solvent at 50–100° C., preferably 50–90° C. The polymerization time is not specially limited, but usually it is in the range of 5 minutes to 10 hours, preferably 5 minutes to 5 hours. The temperature, catalyst mole ratio and hydrogen concentration of the polymerization temperature are adjusted so that the melt index (ASTM D 1238-73, Condition E) of the resulting polymer falls under the range of 0.0001 to 0.5 g/10 min, preferably 0.001 to 0.5 g/10 min. Further, the amount of the polymer obtained in the first-stage polymerization is in the range of 10 to 90 wt.%, preferably 20 to 80 wt.%, based on the total polymer quantity.

A polymerization temperature outside the range described above is not desirable because it will result in lowering of the polymerization speed or increased production of a low molecular weight polymer. Further, if the melt index and the amount of polymer produced in the first stage are outside the respective ranges set forth above, the final polymer will be deteriorated in physical properties and processability.

Then, in the second-stage polymerization, in the case where the chromium oxide-supported solid catalyst component alone was used as the solid catalyst component, there are added as catalyst the solid catalyst component containing at least magnesium and titanium and the aluminum compound of the general formula $AlR'_p X_{3-p}$ to allow polymerization to proceed. Where both the chromium oxide-supported solid catalyst component and the solid catalyst component containing at least magnesium and titanium were used in the first-stage polymerization, the aluminum compound of the general formula $AlR'_p X_{3-p}$ is added as catalyst. The polymerization is carried out at 50–100° C., preferably 50–90° C., for usually 5 minutes to 10 hours, preferably 5 minutes to 5 hours. The melt index (ASTM D 1238-73, Condition E) of the polymer produced is in the range of 0.01 to 50 g/10 min, preferably 0.01 to 10 g/10 min. Adjustment of the melt index is made by a known method.

The amount of polymer produced in the second stage is in the range of 90–10 wt.%, preferably 80–20 wt.% of the total polymer quantity. If it is outside this range, the final polymer will not be satisfactory in physical properties.

The melt index of the ethylene polymer thus produced according to the present invention is preferably in the range of 0.001 to 1 g/10 min, more preferably 0.001 to 0.5 g/10 min.

Even when the first- and second-stage polymerization are performed in reverse order, there will be obtained a polymer having a wide molecular weight distribution and partially improved physical properties. However, the polymer will have an increased number of gels, causing deterioration in appearance of a formed article obtained from the polymer.

According to the process of the present invention it has become possible to produce in high productivity a well-balanced ethylene polymer or copolymer having a large melt tension, a good processability and a high ESCR.

The following examples are given to further illustrate the present invention, but it is to be understood that the invention is not limited thereto.

Reference will first be made below to measuring methods used in the following working and comparative examples. Polymers obtained in those examples were subjected to the following treatment and thereafter measured for physical properties.

Pre-treatment

Kneaded in a nitrogen atmosphere at 145° C. for 15 minutes using a plastograph manufactured by Toyo Seiki K.K.

Melt Index (MI)

According to ASTM D 1238-73 Measured value according to Condition E and that according to Condition N are shown in terms of $MI^2$ and $MI^{10}$, respectively.

Flow Ratio (FR)

$MI^{10}/MI^2$. The larger this value, the wider the molecular weight distribution.

Die Swell Ratio (DSR)

Ratio of the outside diameter of extrudate at the time of $MI^{10}$ measurement to the orifice diameter (2.10 mm).

Density

According to ASTM D 1505-68.

Melt Tension (MT)

Using a melt tension tester manufactured by Toyo Seiki K.K., a polymer melted at a melting temperature of 190° C. in a cylinder (inside diameter 9.55 mm) is extruded through an orifice (diameter 2.10 mm, length 8.00 mm) at a constant rate (piston descending rate: 20 mm/min), then a strand extruded through a load cell is taken up by means of a roller 5.0 cm in outside diameter rotating at 100 rpm, and the stress (unit: g) generated at this time is used as a melt tension. In the event the strand breaks before the roller revolution reaches 100 rpm, the stress at that moment is used as a melt tension. Resistance to Environmental Stress Cracking (ESCR):

According to JIS K-6760. Using 10 vol.% Liponox NCI as a test solution, the time until cracking in half the number of test pieces is used as ESCR.

Butene-1 Content

Measured on the basis of $^{13}$C-NMR.

Fish Eye

The number of fish eyes observed in a 170° C. -pressed, 100 μm thick, 10 cm × 10 cm film was checked visually.

Preparation of Catalyst Components

Solid Catalyst Component A 20 g of silica (Grade 952, a product of Fuji-Davison Co.), after vacuum-drying at 300° C. for 3 hours, was immersed in a solution of 0.4 g chromium trioxide dissolved in 100 ml of pure water. After stirring at room temperature for 1 hour, the water was removed at 120° C. in a nitrogen atmosphere, followed by vacuum drying at 120° C. for 10 hours. Then, calcining was performed at 800° C. for 3 hours in a fluidized bed while passing oxygen. The resulting activated solid catalyst component was preserved in a nitrogen atmosphere.

Solid Catalyst Component B 10 g of anhydrous magnesium chloride, 0.5 g of 1,2-dichloroethane and 1.7 g of titanium tetrachloride were put in a nitrogen gas atmosphere into a stainless steel pot having a capacity of 400 ml and containing 25 stainless steel balls each ½ inch in diameter, and ball-milled at room temperature for 16 hours to obtain a solid catalyst component containing 35 mg of titanium per gram thereof.

Solid Catalyst Component C 20 g of silica (Grade 952, a product of Fuji-Davison Co.), after vacuum-drying at 300° C. for 3 hours, was placed in a three-necked 300 ml flask, then 150 ml of dry hexane was added and further 0.6 g of t-butyl chromate was added and dissolved. After stirring at room temperature for 1 hour, the hexane was removed at 80° C. in a nitrogen atmosphere, followed by vacuum-drying at the same temperature for 5 hours. Then, there was performed calcining for activation at 800° C. for 3 hours in a fluidized bed while passing oxygen. The resulting activated solid catalyst component was preserved in a nitrogen atmosphere.

Solid Catalyst Component D

In the preparation of the solid catalyst component A, 2 mmols of titanium tetraisopropoxide was carefully added dropwise to 10 g of the 120° C. 10 hours vacuum-dried solid material in a fluidized bed in a nitrogen gas atmosphere at 170° C. Then, the temperature of the system was raised to 700° C. and calcining was performed for 5 hours while passing dry air. The resulting activated solid catalyst component was preserved in a nitrogen atmosphere.

Solid Catalyst Component E 10 g of anhydrous magnesium chloride, 4.4 g of aluminum triethoxide and 2.7 g of titanium tetrachloride were charged into the same stainless steel pot as that used in the preparation of the solid catalyst component B in a nitrogen gas atmosphere, and ball-milled at room temperature for 16 hours to obtain a solid catalyst component containing 39 mg of titanium per gram thereof.

Preparation of Modified Organoaluminum Compound

Nitrogen was introduced and deoxidized pure water was added in stages, 20 μl in each stage, to a total amount of 0.9 ml (H$_2$O/Al mol ratio=1/1) over a period of 10 minutes. Thereafter, reaction was allowed to take place at room temperature for 30 minutes. The hexane solution after termination of the reaction was a transparent homogeneous solution.

Example 1

A stainless steel autoclave having a capacity of 3 liters and equipped with a stirrer was purged with nitrogen and charged with 1.5 l of hexane, then 80 mg of the solid catalyst component A and 2 mmols of the modified organoaluminum compound were added and heating was made to 80° C. under stirring. The system was pressurized to 1.5 kg/cm$^2$.G due to the vapor pressure of nitrogen and that of hexane.

Hydrogen was introduced up to a total pressure of 4 kg/cm$^2$.G and then ethylene introduced up to a total pressure of 14 kg/cm$^2$.G. In this state a first-stage polymerization was allowed to start, which was continued for 1 hour while maintaining the total pressure at 14 kg/cm$^2$.G with ethylene.

After cooling, ethylene was purged and the remaining ethylene was purged several times with nitrogen, then 10 mg of the solid catalyst component B and 1 mmol of triethylaluminum were added, allowing a second-stage polymerization to take place at 80° C. Hydrogen was introduced up to a total pressure of 7.8 kg/cm$^2$.G and then ethylene introduced up to a total pressure of 14.1 kg/cm$^2$.G continuously for a period of 30 minutes. Results of the polymerizations and measured physical properties are as shown in Table 1.

The polymer ratio (production ratio) in the first and second stages was determined from the amount of ethylene produced.

Example 2

Using the solid catalyst components D and E in place of the solid catalyst components A and B, respectively in Example 1, and under the conditions shown in Table 1, there was performed polymerization. Results are as shown in Table 1.

Example 3

Using the same catalyst as in Example 2, the second-stage polymerization conditions were changed as follows.

Heating was made to 80° C. and hydrogen was introduced up to a total pressure of 3.2 kg/cm$^2$.G, then 40 g of butene-1 was introduced together with ethylene and polymerization was allowed to take place for 1 hour while introducing ethylene to maintain the total pressure at 10 kg/cm$^2$.G. Results are as shown in Table 1.

Example 4

A stainless steel autoclave having a capacity of 3 liters and equipped with a stirrer was purged with nitrogen and charged with 1.5 l of hexane, then 80 mg of the solid catalyst component A, 10 mg of the solid catalyst component B and 2 mmols of the modified organoaluminum compound were added and heating was made to 80° C. under stirring. The system was pressurized to 1.5 kg/cm$^2$.G by the vapor pressure of nitrogen and that of hexane.

Hydrogen was introduced up to a total pressure of 4 kg/cm$^2$.G and then ethylene introduced up to a total pressure of 14 kg/cm$^2$.G. In this state a first-stage polymerization was allowed to start, which was continued for 1 hour while maintaining the total pressure at 14 kg/cm$^2$.G with ethylene.

After cooling, ethylene was purged and the remaining ethylene was purged several times with nitrogen, then 1 mmol of triethylaluminum was added and a second-stage polymerization was performed at 80° C. Hydrogen was introduced up to a total pressure of 7.8 kg/cm$^2$.G and then ethylene introduced up to a total pressure of 14.1 kg/cm$^2$.G continuously for 1 hour. Results of the polymerizations and measured physical properties are as shown in Table 1.

Examples 5–8

Polymerizations were conducted using the catalyst obtained in Example 4 and under the conditions set forth in Table 1. Results are as shown in the same table.

Examples 9–10

Polymerization were conducted using the solid catalyst components shown in Table 1 in place of the one used in Example 4. Results are as set forth in Table 1.

Example 11

Using the catalyst obtained in Example 4, copolymerization of the ethylene and butene-1 was conducted in a first stage and then in a second stage there was performed homopolymerization of ethylene. Results are as shown in Table 1.

Comparative Examples 1–4

Only a first-stage polymerization was conducted in different combinations of solid catalyst components A, B and organoaluminum compounds as shown in Table 1. Results are as set forth in the same table.

Comparative Example 5

Polymerization was performed in the same way as in Example 4 except that the production ratio was adjusted to be outside the range defined in the present invention. Results are as set forth in Table 1.

Comparative Example 6

The first- and second-stage polymerizations in Example 4 were conducted in completely reverse order. Results are as shown in Table 1.

Comparative Example 7

The polymers obtained in Comparative Examples 1 and 3 were mixed in the same production ratio as in Example 4 and the resulting mixture was subjected to various measurements. Results are as shown in Table 1.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| First Stage | | | | | | | | | | |
| Solid Catalyst Component (mg) | A (80) | D (80) | D (40) | A(80)+ B(10) | A(80)+ B(10) | A(40)+ B(5) | A(80)+ B(10) | A(80)+ B(10) | C(40)+ E(5) | D(80)+ E(10) |
| Organoaluminum | Modified | Modified | Modified | Modified | Modified | Modified | Modified | Modified | Modified | Modified |

TABLE 1-continued

| Compound** (mmol) | (2) | (2) | (2) | (2) | (2) | (2) | (2) | (2) | (2) | (2) |
|---|---|---|---|---|---|---|---|---|---|---|
| Partial Pressure of Hydrogen (kg/cm$^2$) | 2.5 | 7.5 | 2.5 | 2.5 | 2.5 | 2.5 | 2.5 | 2.5 | 2.5 | 2.5 |
| Partial Pressure of Ethylene (kg/cm$^2$) | 10 | 5.0 | 10 | 10 | 10 | 10 | 10 | 10 | 10 | 10 |
| Comonomer | — | — | — | — | — | — | — | — | — | — |
| Temperature (°C.) | 80 | 80 | 80 | 80 | 80 | 80 | 80 | 80 | 80 | 80 |
| Time (min) | 60 | 20 | 60 | 15 | 30 | 60 | 40 | 40 | 60 | 30 |
| Second Stage | | | | | | | | | | |
| Solid Catalyst Component (mg) | B (10) | E (10) | E (5) | — | — | — | — | — | — | — |
| Organoaluminum Compound** (mmol) | TEA (1) | TEA (1) | TEA (1) | TEA (1) | TEA (1) | TEA (1) | TEA (1) | TEA (1) | TEA (1) | TEA (1) |
| Partial Pressure of Hydrogen (kg/cm$^2$) | 6.3 | 2.6 | 1.7 | 6.3 | 6.3 | 6.3 | 6.3 | 6.3 | 6.3 | 2.6 |
| Partial Pressure of Ethylene (kg/cm$^2$) | 6.3 | 6.0 | 6.8 | 6.3 | 6.3 | 6.3 | 6.3 | 6.3 | 6.3 | 6.0 |
| Comonomer | — | — | Butene-1 | — | — | — | — | — | — | — |
| Temperature (°C.) | 80 | 80 | 80 | 80 | 80 | 80 | 80 | 80 | 80 | 70 |
| Time (min) | 30 | 60 | 60 | 60 | 60 | 60 | 15 | 5 | 60 | 60 |
| Result | | | | | | | | | | |
| Polymer Yield (g) | 229 | 176 | 158 | 191 | 227 | 168 | 140 | 124 | 128 | 210 |
| Production Ratio (weight ratio) 1'st Stage/2'nd Stage | 70/30 | 15/85 | 50/50 | 27/73 | 36/64 | 58/42 | 73/27 | 10/90 | 36/64 | 30/70 |
| Comonomer Content (mol %) | — | — | 3.3 | — | — | — | — | — | — | — |
| MI$^2$ (g/10 min) | 0.01 | 0.8 | 0.02 | 0.7 | 0.34 | 0.08 | 0.03 | 0.007 | 0.41 | 0.23 |
| MI$^{10}$ (g/10 min) | 0.32 | 11.2 | 0.70 | 10.3 | 5.4 | 1.7 | 0.65 | 0.44 | 6.1 | 4.0 |
| FR | 32.0 | 14.0 | 35.0 | 14.7 | 15.9 | 21.3 | 21.7 | 62.9 | 14.9 | 17.4 |
| DSR | 1.49 | 2.03 | 1.57 | 2.09 | 2.05 | 1.71 | 1.54 | 1.43 | 2.07 | 2.07 |
| Bulk Density (g/cm$^3$) | 0.29 | 0.29 | 0.29 | 0.30 | 0.29 | 0.31 | 0.29 | 0.28 | 0.30 | 0.28 |
| Density (g/cm$^3$) | 0.9501 | 0.9521 | 0.9293 | 0.9531 | 0.9526 | 0.9516 | 0.9509 | 0.9497 | 0.9529 | 0.9518 |
| ESCR (hr) | 30 | 80 | 160 | 120 | 80 | 50 | 30 | 25 | 120 | 75 |
| MT (g) | 33 | 8 | 32 | 10 | 15 | 28 | 30 | 38 | 11 | 19 |
| Gel | 2 | 1 | 0 | 1 | 2 | 2 | 3 | 0 | 2 | 1 |

| | Ex. 11 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| First Stage | | | | | | | | |
| Solid Catalyst Component (mg) | A(40) + B(5) | A (80) | A (80) | B (10) | B (10) | A(80) + B(10) | A(80) + B(10) | Comparative Example 1 + Comparative Example 3 Mixture |
| Organoaluminum Compound** (mmol) | Modified (2) | Modified (2) | TIBA (2) | TEA (1) | TEA (1) | Modified (2) | TEA (1) | |
| Partial Pressure of Hydrogen (kg/cm$^2$) | 2.5 | 2.5 | 2.5 | 6.3 | 2.5 | 2.5 | 6.3 | |
| Partial Pressure of Ethylene (kg/cm$^2$) | 10 | 10 | 10 | 6.3 | 10 | 10 | 6.3 | |
| Comonomer | Butene-1 | — | — | — | — | — | — | |
| Temperature (°C.) | 80 | 80 | 80 | 80 | 80 | 80 | 80 | |
| Time (min) | 60 | 60 | 60 | 60 | 60 | 5 | 60 | |
| Second Stage | | | | | | | | |
| Solid Catalyst Component (mg) | — | — | — | — | — | — | — | |
| Organoaluminum Compound** (mmol) | TEA (1) | — | — | — | — | TEA (1) | Modified (2) | |
| Partial Pressure of Hydrogen (kg/cm$^2$) | 1.7 | — | — | — | — | 1.7 | 2.5 | |
| Partial Pressure of Ethylene (kg/cm$^2$) | 6.8 | — | — | — | — | 6.8 | 10 | |
| Comonomer | — | — | — | — | — | — | — | |
| Temperature (°C.) | 80 | — | — | — | — | 80 | 80 | |
| Time (min) | 60 | — | — | — | — | 60 | 15 | |
| Result | | | | | | | | |
| Polymer Yield (g) | 156 | 168 | 32 | 157 | trace | 176 | 128 | — |
| Production Ratio (weight ratio) 1'st Stage/2'nd Stage | 50/50 | 100/0 | 100/0 | 100/0 | 100/0 | 5/95 | 98/2 | 27/73 |
| Comonomer Content (mol %) | 4.1 | — | — | — | — | — | — | — |
| MI$^2$ (g/10 min) | 0.02 | 0.003 | 6.6 | 6.3 | — | 0.10 | 5.0 | 0.8 |
| MI$^{10}$ (g/10 min) | 0.70 | 0.17 | 107 | 72.5 | — | 1.10 | 40 | 10.3 |
| FR | 35.0 | 56.7 | 16.1 | 11.5 | — | 11.0 | 8.0 | 12.9 |
| DSR | 1.57 | 1.43 | 2.48 | 1.21 | — | 1.38 | — | 1.80 |
| Bulk Density (g/cm$^3$) | 0.29 | 0.32 | 0.11 | 0.29 | — | 0.28 | 0.30 | — |
| Density (g/cm$^3$) | 0.9293 | 0.9496 | 0.9480 | 0.9545 | — | 0.9531 | 0.9548 | 0.9536 |
| ESCR (hr) | 160 | 15 | 8 | 30 | — | 60 | 45 | 50 |
| MT (g) | 32 | 41 | 1 | 1 | — | 11 | 1 | 8 |

TABLE 1-continued

| Gel | 0 | 0 | 0 | 0 | — | 0 | 0 | 17 |

In Table 1:
**Modified: modified organoaluminum compound
TEA: triethylaluminum
TIBA: triisobutylaluminum

What is claimed is:

1. A process for preparing an ethylene polymer by a two-stage polymerization of ethylene or ethylene and an α-olefin having 3 to 6 carbon atoms in an inert hydrocarbon at 50–100° C. using a coordination polymerization catalyst containing a solid component and an organoaluminum compound, said solid component containing a transition metal compound, which process comprises:

(a) in a first stage, producing 10–90% by weight based on the total polymer quantity of a polymer having a melt index in the range of 0.0001 to 0.5 g/10 min as measured according to ASTM D 1238-73, Condition E, using as said solid component a solid product obtained by supporting chromium trioxide or a compound which on calcining forms chromium oxide at least partially, on an inorganic oxide carrier selected from the group consisting of silica, alumina, silica-aluminum, titania, zirconia, thoria and mixtures thereof followed by calcining in a substantially water-free non-reducing atmosphere at a temperature in the range of 450° to 900° C. for 0.5 to 10 hours, and using as said organoaluminum compound a compound of the general formula

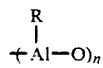

wherein R is an alkyl group having 1 to 18 carbon atoms and n is $2 \leq n \leq 100$; and (b) in a second stage, producing 90–10% by weight based on the total polymer quantity of a polymer having a melt index in the range of 0.01 to 50 g/10 min as measured according to ASTM D 1238-73, Condition E, using as said solid component a solid material containing at least magnesium and titanium, and using as said organoaluminum compound a compound of the general formula $AlR'_pX_{3-p}$ wherein R' is an alkyl group having 1 to 20 carbon atoms, X is halogen and/or alkoxy and p is $0 < p \leq 3$, in the presence of the polymer obtained in the first stage.

2. A process for preparing an ethylene polymer by a two-stage polymerization of ethylene or ethylene and an α-olefin having 3 to 6 carbon atoms in an inert hydrocarbon at 50–100° C. using a coordination polymerization catalyst containing a solid component and an organoaluminum compound, said solid component containing a transition metal compound, which process comprises:

(a) in a first stage, producing 10–90% by weight based on the total polymer quantity of a polymer having a melt index in the range of 0.0001 to 0.5 g/10 min as measured according to ASTM D 1238-73, Condition E, using as said solid component a solid product and a solid material containing at least magnesium and titanium, said solid product being obtained by supporting chromium trioxide or a compound which on calcining forms chromium oxide at least partially, on an inorganic oxide carrier selected from the group consisting of silica, alumina, silica-alumina, titania, zirconia, thoria and mixtures thereof followed by calcining in a substantially water-free non-reducing atmosphere at a temperature in the range of 450° to 900° C. for 0.5 to 10 hours, and using as said organoaluminum compound a compound of the general formula

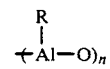

wherein R is an alkyl group having 1 to 18 carbon atoms and n is $2 \leq n \leq 100$; and (b) in a second stage, producing 90–10% by weight based on the total polymer quantity of a polymer having a melt index in the range of 0.01 to 50 g/10 min, by adding a compound of the general formula $AlR'_pX_{3-p}$ wherein R' is an alkyl group having 1 to 20 carbon atoms, X is halogen and/or alkoxy and p is $0 < p \leq 3$, after completion of the first-stage polymerization.

3. A process as set forth in claim 1 or claim 2, wherein the amount of the polymer produced in the first stage is in the range of 20% to 80% by weight of the total polymer quantity.

4. A process as set forth in claim 1 or claim 2, wherein the compound of the general formula

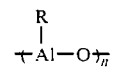

is a compound obtained by reacting water with R₃Al in a water/Al mol ratio in the range of 0.25/1 to 1.2/1 at a temperature in the range of −70° to 100° C.

5. A process as set forth in claim 1 or claim 2, wherein the compound of the general formula

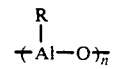

is used in an amount in the range of 1000/1 to 1/1 in terms of Al/Cr mol ratio.

* * * * *